US007770076B2

(12) United States Patent (10) Patent No.: US 7,770,076 B2
Mills et al. (45) Date of Patent: Aug. 3, 2010

(54) MULTI-PLATTER DISK DRIVE CONTROLLER AND METHODS FOR SYNCHRONOUS REDUNDANT DATA OPERATIONS

(75) Inventors: Andy Mills, San Jose, CA (US); Michael C. Stolowitz, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/266,764

(22) Filed: Nov. 2, 2005

(65) Prior Publication Data

US 2006/0107131 A1 May 18, 2006

Related U.S. Application Data

(60) Provisional application No. 60/624,614, filed on Nov. 2, 2004.

(51) Int. Cl.
*G11C 29/00* (2006.01)
*G11B 5/09* (2006.01)
(52) U.S. Cl. ........................................ 714/710; 360/47
(58) Field of Classification Search ........................ None
See application file for complete search history.

(56) References Cited

U.S. PATENT DOCUMENTS 3,729,725 A * 4/1973 Denney et al. ................ 360/47
4,423,448 A * 12/1983 Frandsen .................. 360/78.04
5,355,486 A * 10/1994 Cornaby ..................... 718/102
5,390,313 A * 2/1995 Yanai et al. ................. 711/112
5,617,425 A * 4/1997 Anderson ................... 714/710
5,896,493 A * 4/1999 Rao ............................. 714/6
5,901,010 A * 5/1999 Glover et al. ............. 360/78.12
6,061,348 A * 5/2000 Castrigno et al. ........... 370/363
6,121,742 A * 9/2000 Misso ........................ 318/562
6,237,052 B1 * 5/2001 Stolowitz ..................... 710/61
6,502,178 B1 * 12/2002 Olbrich ...................... 711/202
6,557,123 B1 * 4/2003 Wiencko et al. ............ 714/701
6,563,657 B1 * 5/2003 Serrano et al. ............... 360/48
6,636,940 B1 * 10/2003 Hodges ...................... 711/112
6,952,797 B1 * 10/2005 Kahn et al. ................. 714/770
7,102,842 B1 * 9/2006 Howard ....................... 360/61
7,430,091 B2 * 9/2008 Manasse .................. 360/77.01
7,484,137 B2 * 1/2009 Blaum et al. ............... 714/708
2005/0091452 A1 * 4/2005 Chen et al. ................. 711/114

* cited by examiner

*Primary Examiner*—K. Wong
(74) *Attorney, Agent, or Firm*—Zilka-Kotab, PC

(57) ABSTRACT

The present disclosure pertains to multiple-platter disk drive digital data storage with integrated redundancy operations for improved reliability. Within a single disk drive assembly (300), one or more individual storage platters (304) can be used to store redundant data, enabling recovery of user data in the event that another platter (302) is defective, fails or is otherwise unavailable. "On-the-fly" redundancy operations (FIGS. 6A,6B) can be made transparent to the user or host, and impose no significant speed penalty. A data path switch (26) can reconfigure mappings between logical ports and platter interfaces (210) as needed.

19 Claims, 19 Drawing Sheets

Mapping Register

| r | PP_L4 | PP_L3 | PP_L2 | PP_L1 | PP_L0 |

24

Mapping Register Description

| BITS | FIELD | CONTENTS |
|---|---|---|
| 2:0 | Logical Port 0 | # of connected platter interface |
| 5:3 | Logical Port 1 | # of connected platter interface |
| 8:6 | Logical Port 2 | # of connected platter interface |
| 11:9 | Logical Port 3 | # of connected platter interface |
| 14:12 | Logical Port 4 | # of connected platter interface |
| 15 | Reserved | 0 |

MULTI-PLATTER DISK DRIVE CONTROLLER AND METHODS FOR SYNCHRONOUS REDUNDANT DATA OPERATIONS

RELATED APPLICATIONS

This application claims priority from U.S. Provisional Patent Application Ser. No. 60/624,614, filed Nov. 2, 2004 and incorporated herein by this reference.

COPYRIGHT NOTICE

© 2004-2005 Netcell Corporation. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

The invention lies in the broad field of ELECTRICAL COMPUTERS AND DIGITAL DATA PROCESSING SYSTEMS and, more specifically, pertains to multiple-platter disk drives with integrated redundancy operations for improved reliability.

BACKGROUND OF THE INVENTION

There is a growing usage of digital storage, specifically using hard disk drives, to store personal information and digitized images/video/audio. As the personal importance of this data grows, so does the importance of reliability of the storage system used, as very often original data resides on these storage devices for extended periods of time before they can be backed up onto another media.

Expensive SCSI hard disk drives have long been used due to their high reliability over mainstream ATA or SATA based disk drives in situations where data integrity and storage reliability are important. For example, SCSI disk drives are often rated at 1 million hours MTBF (mean-time-between-failures) at 80% duty cycles, whereas the more common desktop hard disk drives are rated 600,000 hours MTBF at 20% duty cycles. Fort this reason, SCSI is often the choice in server and high end video editing workstation class computers. Further, SCSI drives are often higher performance than their lower cost ATA/SATA drive cousins. 15,000 RPM SCSI vs. 10,000 RPM SATA for the fastest drives are typical. Disk drives prices and costs have continued to drop significantly in recent years as they are increasingly used in the mainstream of computing and digital entertainment. However, performance and reliability of the lower cost disk drives still significantly lags that of SCSI. The need remains, therefore, for innovations to improve reliability in disk drives generally while avoiding the high cost of known SCSI drives.

SUMMARY OF PREFERRED EMBODIMENTS

The present invention in several presently preferred embodiments applies the concepts of redundancy in disk drive storage, previously applied to arrays of disk drives, such as RAID arrays, in a radically new way. In accordance with the invention, one or more individual platters within a single disk drive unit are employed to store redundant data, using mirroring, striping and other redundancy schemes previously reserved for RAID arrays. Moreover, in some embodiments, synchronous redundant data transfers and on-the-fly XOR approaches are employed across multiple platter surfaces to create a high performance disk drive with a higher degree of reliability.

Additional aspects and advantages of this invention will be apparent from the following detailed description of preferred embodiments thereof, which proceeds with reference to the accompanying drawings.

BRIEF DESCRIPTION OF THE ADDITIONAL DRAWINGS

FIG. 7 is one example of a Mapping Register structure; the Mapping Register controls the configuration of the data paths between the logical and platter interface data ports in one embodiment of the multi-platter disk controller.

DETAILED DESCRIPTION OF PREFERRED EMBODIMENTS

Figure 1:
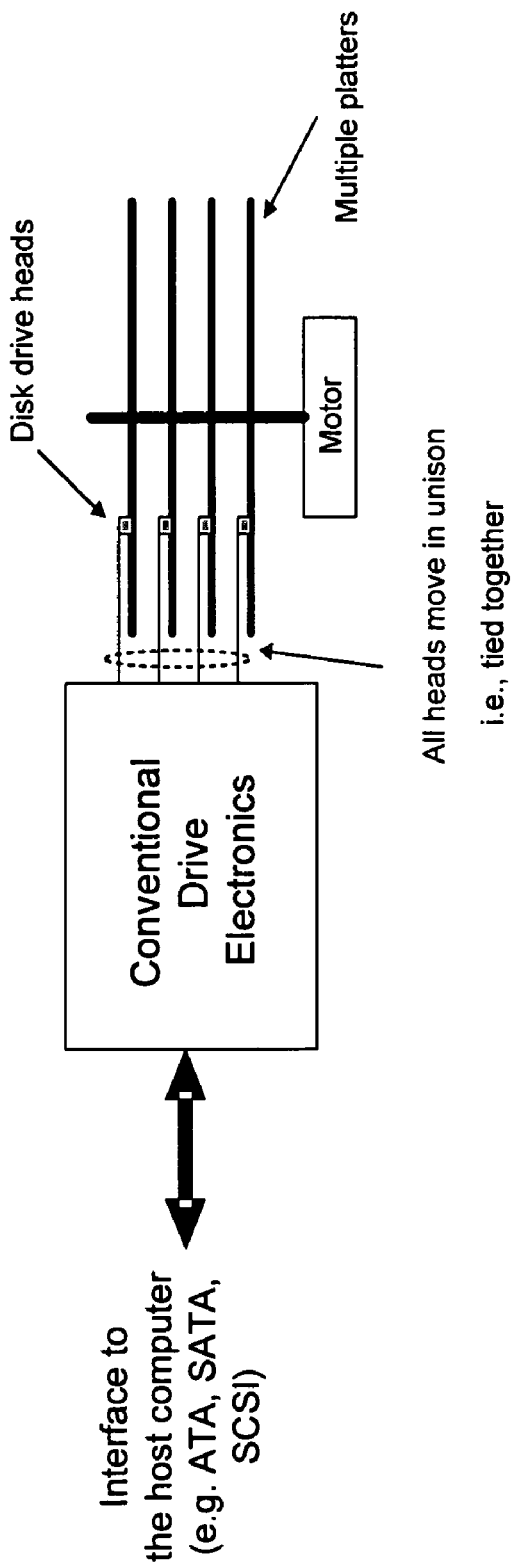
FIG. 1 (prior art) is a simplified illustration of a conventional multi-platter disk drive and associated electronics coupled to a host interface for digital data storage and retrieval.

FIG. 1 is a simplified illustration of a conventional, well-known multi-platter disk drive and associated electronics coupled to a host interface for digital data storage and retrieval. In this prior art disk drive, the storage platters are rotated in unison on a common spindle coupled to a motor. As noted, they can rotate on the order of 10,000 rpm. At least one "read-write head" is provided for each platter surface to read or write data as the surface moves past the head in close proximity. Details of read-write heads and associated electronics are well known and therefore omitted here.

In the conventional drive, the read-write heads are mounted to a common actuator, and accordingly they all move (or "reposition") together over the platter surfaces. In the case of a disk read operation, the drive electronics recover data from the read-write heads and buffer it. The drive electronics provide a standard interface to a host computer. Such interfaces include ATA, SATA (serial ATA) and SCSI. Conversely, for a disk write operation, the drive electronics receive data via the host interface and store it on the magnetic platters in the drive.

Figure 2:
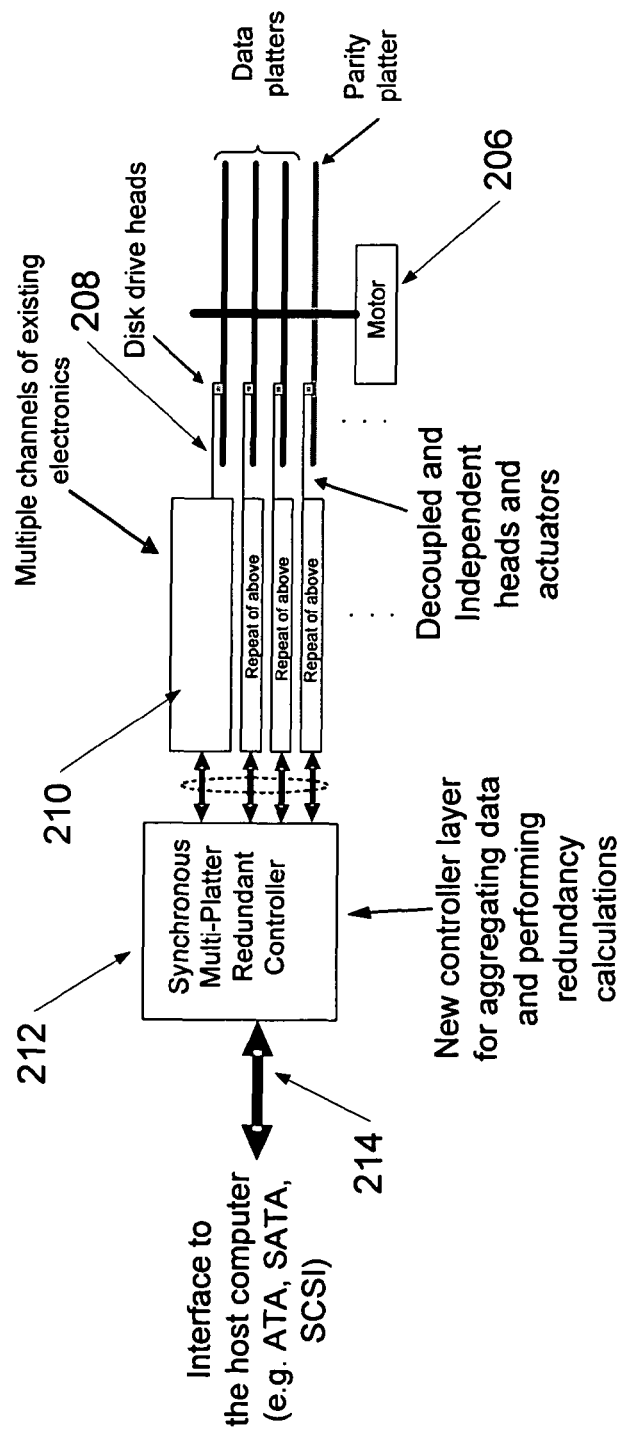
FIG. 2 is a simplified illustration of a new disk drive consistent with one embodiment of the present invention to provide improved performance and reliability.

FIG. 2 is a simplified illustration of a new disk drive consistent with one embodiment of the present invention to provide improved performance and reliability. As further explained below, performance can be improved by managing the read-write electronics, heads and actuators for each platter independently of the other platters. Further, reliability can be dramatically improved over the prior art by employing redundancy operations within a single drive package. For some applications, the need for a RAID array of drives to improve reliability of data storage can be reduced or eliminated.

In FIG. 2, the disk drive has any number of platters; just a few platters 202 are shown for illustration. The platters are driven by a motor 206 and a common spindle in this example, as in prior art. Here, however, each or at least some of the read-write heads (or simply "drive heads") are decoupled so as to allow independent repositioning over the corresponding platter. Each decoupled drive head accordingly has a corresponding actuator. So, for example, the top drive head actuator 208 can reposition the head independently of the other heads/actuators.

In one embodiment, drive electronics in FIG. 2 include an individual platter interface for each decoupled platter. The platter interface, for example platter interface 210, functions similarly to prior art disk drive electronics, to provide read, write and buffering support, but each individual platter, or at least two of them, has its own corresponding platter interface or interface channel. The platter interfaces are coupled to a synchronous multi-platter redundant controller 212, further described below, which in turn implements a standard host interface 214. The synchronous multi-platter redundant controller 212 allows one of the platters to act as a "parity platter" thereby raising the reliability of the overall drive significantly, possibly higher than that of SCSI, while using low cost mainstream drive mechanics and electronics.

Figure 3:
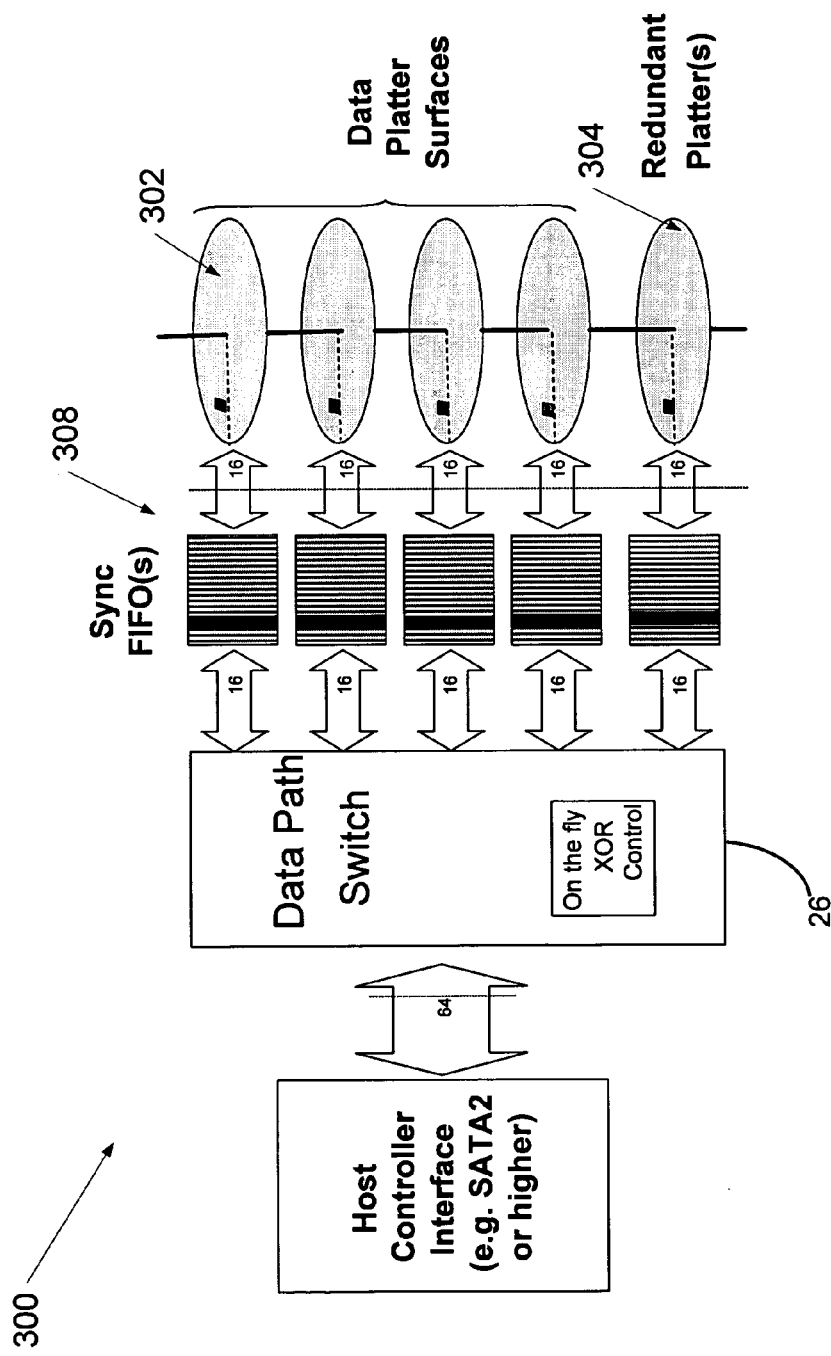
FIG. 3 is a data path illustration showing storage of user data and redundant data on different platters within a single disk drive package.

FIG. 3 further illustrates pertinent data paths showing storage of user data and redundant data on different platters within a single disk drive package 300. In this example, four data platter surfaces, e.g. platter 302, are used to store user data, while another platter 304 is used to store redundant data. In this example, data striping is implemented, using a 64-bit data stripe comprising 16 bits each over the four data platters. A 16-bit parity word is stored for each stripe on the parity platter 304. Other RAID-like strategies can be implemented, all within a single drive package. Preferably, the "native" width of the platter interface, e.g. its internal buffer width, should be used for striping.

FIFO buffers 308 can be used, one for each platter, to synchronize data transfer to and from the individual platter interfaces. In this way, data moves to and from the data path switch 26 synchronously, even though data is moving to and from the drive heads asynchronously, in contradistinction to prior art drives.

In one preferred embodiment, then, individual data paths to/from each read/write head (one per platter surface) are combined and fed directly to an XOR-switch-SRDT arrangement integrated within the drive electronics. One or more platter surfaces are used for redundancy for regeneration of data from a bad sector or platter. This in turn interfaces to a single host IDE, SATA or SCSI link to make the approach totally transparent to the host computer.

Problem with Bad Sectors on Single Platter

Platter characteristics and non-linear defects make it difficult to treat the stack of platter surfaces as a single logical linear surface. A few solutions are possible. The drive manufacturers would need to either mark bad segments across all drives in the same position (resulting in the loss of good segments), or use better quality platters. In any event, the present invention can be used to remedy the effect of bad sectors on disk drive platters. The XOR process further described below provides a means of using a redundant platter surface to regenerate data from a platter with a bad sector at the read or write point. As the XOR operation in a preferred embodiment is handled on the fly, i.e., in-line during data transfer, there is no performance degradation and the overall reliability increases substantially.

The concepts disclosed herein can be extended to multiple redundant platters with multiple XOR circuits or expanded 2 bit parity approaches to regenerate bad data.

Single Motor, Spindle Sync'd Platters Vs. Independent Platters

This same synchronous approach with XOR can applied to both single spindle approaches, where all the platters are tied to one spindle and motor as described earlier, or to the situation where multiple spindles and motors are utilized. The result is better with a common spindle. This synchronization makes the rotational delay the same as a conventional single drive instead of n/(n+1). There may be improvement in bad sector handling (i.e. not all platters need to be marked bad at that spot) with the latter multiple spindle approach.

Implementations of the present invention are expected to significantly lower the cost of high reliability drives by using mainstream, lower cost, e.g., ATA/SATA class drive technology instead of expensive SCSI drives.

Some embodiments of the present invention are expected to provide in a single monolithic drive unit with N times the performance of conventional single or multi-platter drive unit (N=number of data platter surfaces) i.e. using 7200 RPM technology, it is possible to create a virtual 14,400 RPM drive. Data is streamed in parallel to or from two platters at once, thereby doubling the sustained data transfer rates to and from the new disk drive Using synchronous redundant data transfers ("SRDT") versus other conventional striped-parity RAID techniques results in a non-performance degraded solution as others typically use a more complicated block stripe with read-modify-write techniques for redundancy. Using multiple platters based on ATA/SATA drives as described herein, it is possible using multiple disk heads, actuators and electronics to utilize multiple platters within a single disk drive unit as independent parallel data stores combined in a synchronous word RAID-like approach.

Mapping Register

Figure 4:
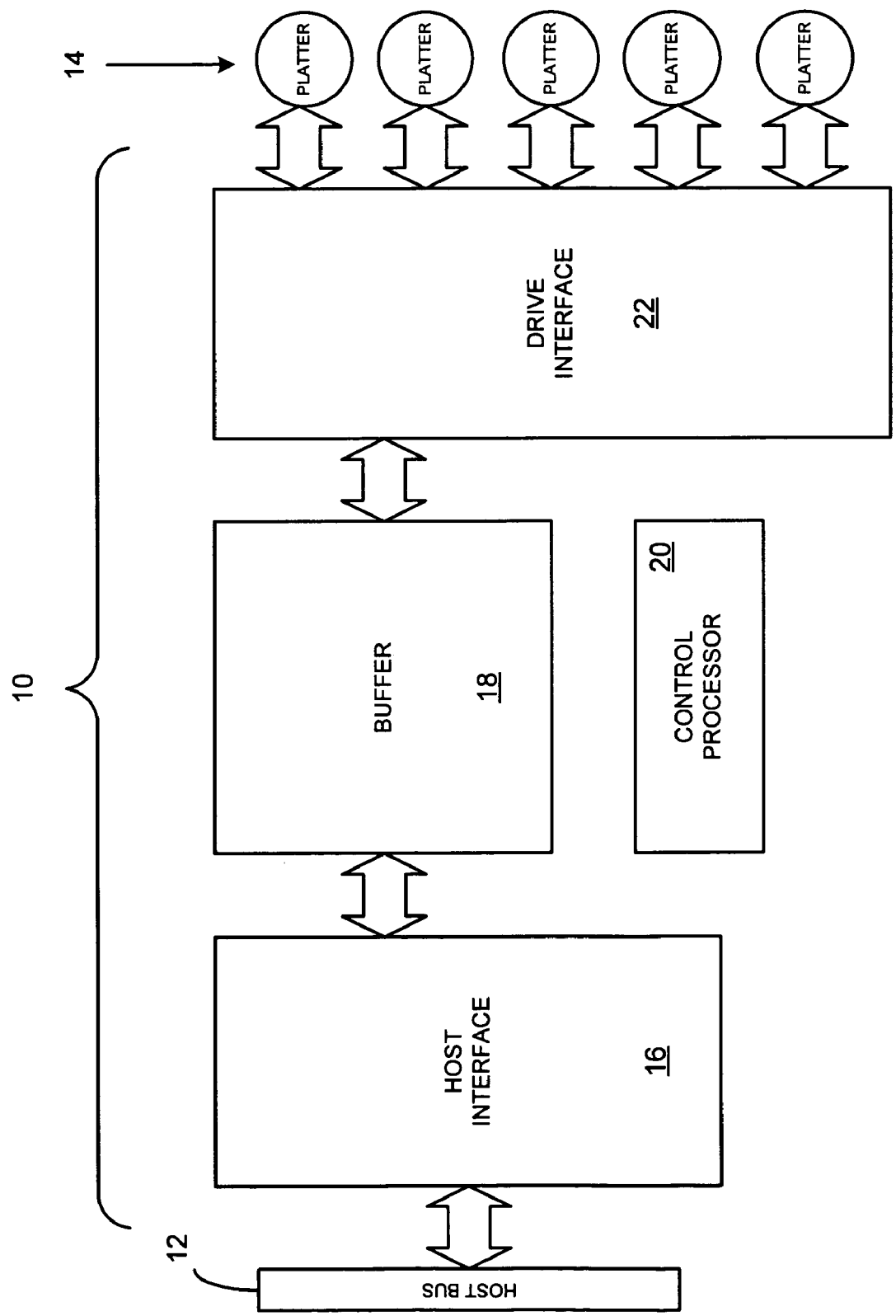
FIG. 4 is a simplified block diagram of a disk controller providing a host interface for interaction with a host bus, and a drive interface for interaction with a plurality of platters of an attached disk drive.

FIG. 4 is a simplified block diagram of a disk controller 10 providing a host interface 16 for interaction with a host bus 12, and a drive interface 22 for interaction with a plurality of platters 14. The controller preferably includes a control processor 20 and a buffer memory 18 for temporary storage of data moving between the host bus and the platters.

Figure 5A:
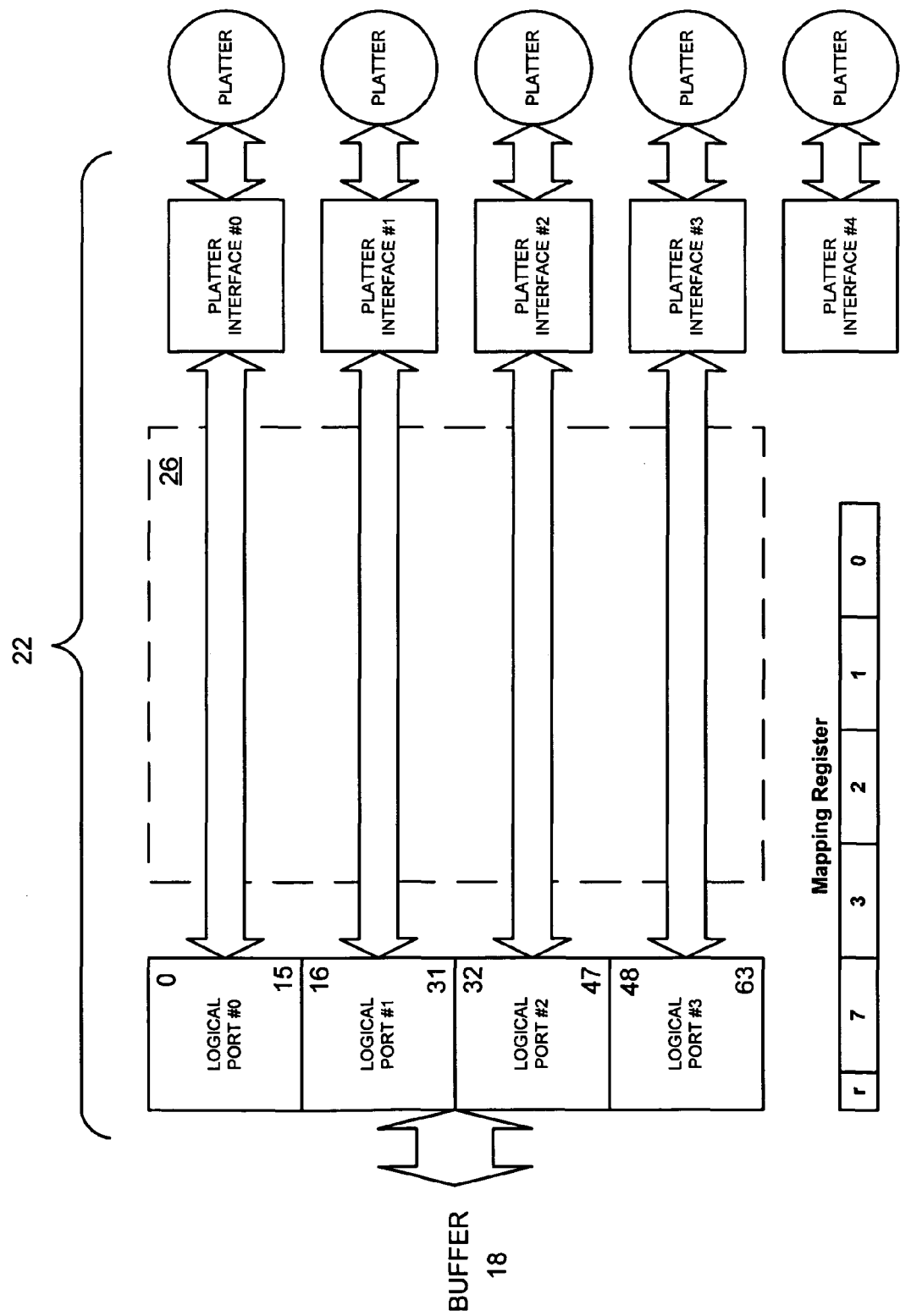
FIG. 5A is a conceptual diagram illustrating direct connections between logical data ports and storage platter interfaces of a disk drive; and it shows an example of corresponding Mapping Register contents.

A platter interface is required for interfacing to each platter of a drive as noted above. A controller thus may have a platter interface per platter, as shown in FIG. 5A. FIG. 5A also shows the corresponding contents of a Mapping Register 24, further described below with reference to FIG. 7.

One of the performance benefits comes from the striping of data across the platters of the drive. For example, reading data from four platters at once yields a four times improvement over the transfer rate of a single platter. For the example shown in FIG. 5A, the sixteen-bit data arriving from each of four platters is merged in logical drive order into sixty-four bit data that is sent to the buffer (18 in FIG. 4). User data was striped, i.e. it was distributed a segment at a time (e.g. 16-bit word) across the platters in a predetermined sequence. We identify that sequence as starting with Logical Platter #0 and proceeding through Logical Platter #n−1, where n is the number of platters in the drive. This stripe sequence is repeated so that the kth segment of the user data corresponds to logical platter (K mod n). In this way, we use the logical platter numbering to reflect the striping order.

Figure 5B:
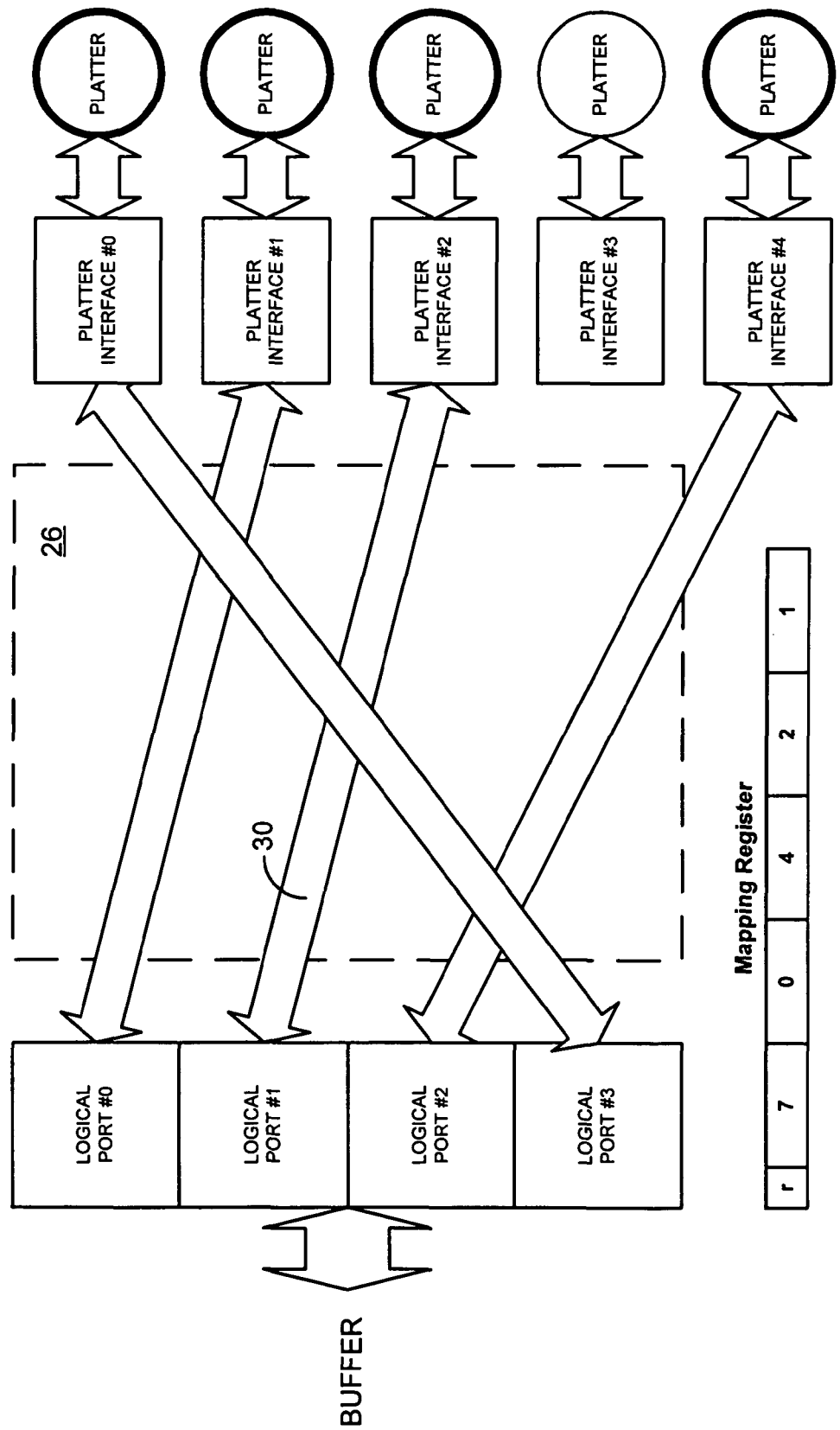
FIG. 5B is a conceptual diagram illustrating one example of assignments of four logical ports to the available five platter interfaces; and it shows an example of corresponding Mapping Register contents.

Accordingly, in the drawing FIG. 5a or 5B, the stack of four "Logical Ports" simply indicates an ordered set of four segments of a stripe. Each "Logical Port" corresponds to a single segment of the stripe, and the whole stack corresponds to an ordered set of four segments.

A 100 MBPS transfer rate, for illustration, from each of the platters, becomes a 400 MBPS transfer rate to the buffer. Dashed box 26 conceptually represents a data path switch described later in detail. The data path switch 26 provides dynamically configurable data paths between logical data ports and physical platters or platter interfaces.

FIG. 5A, with its direct connection between logical data ports and platter interfaces, is only a conceptual diagram. In real applications, the number of available platter interfaces typically will be greater than the number of logical data ports. There may be platter interfaces (thus platters) that are reserved as "hot spares" or the platter interfaces may be grouped into different sub-sets that are accessed independently. FIG. 5B is an example of one of the possible assignments of four logical data ports (Logical Port #0 to Logical Port #3) to the available five platter interfaces, platter interface #0 to platter interface #4). For example, the large arrow 30 simply indicates the assignment of Logical Port #1 to platter interface #2. FIG. 5B also shows the corresponding contents of a Mapping Register 24. Here, the second field from the right in the register corresponds to Logical Port #1, and it contains the value "2" indicating the platter interface #2, as indicated by arrow 30. The data path switch 26 implements logical to platter interface assignments as fully described shortly.

Figure 5C:
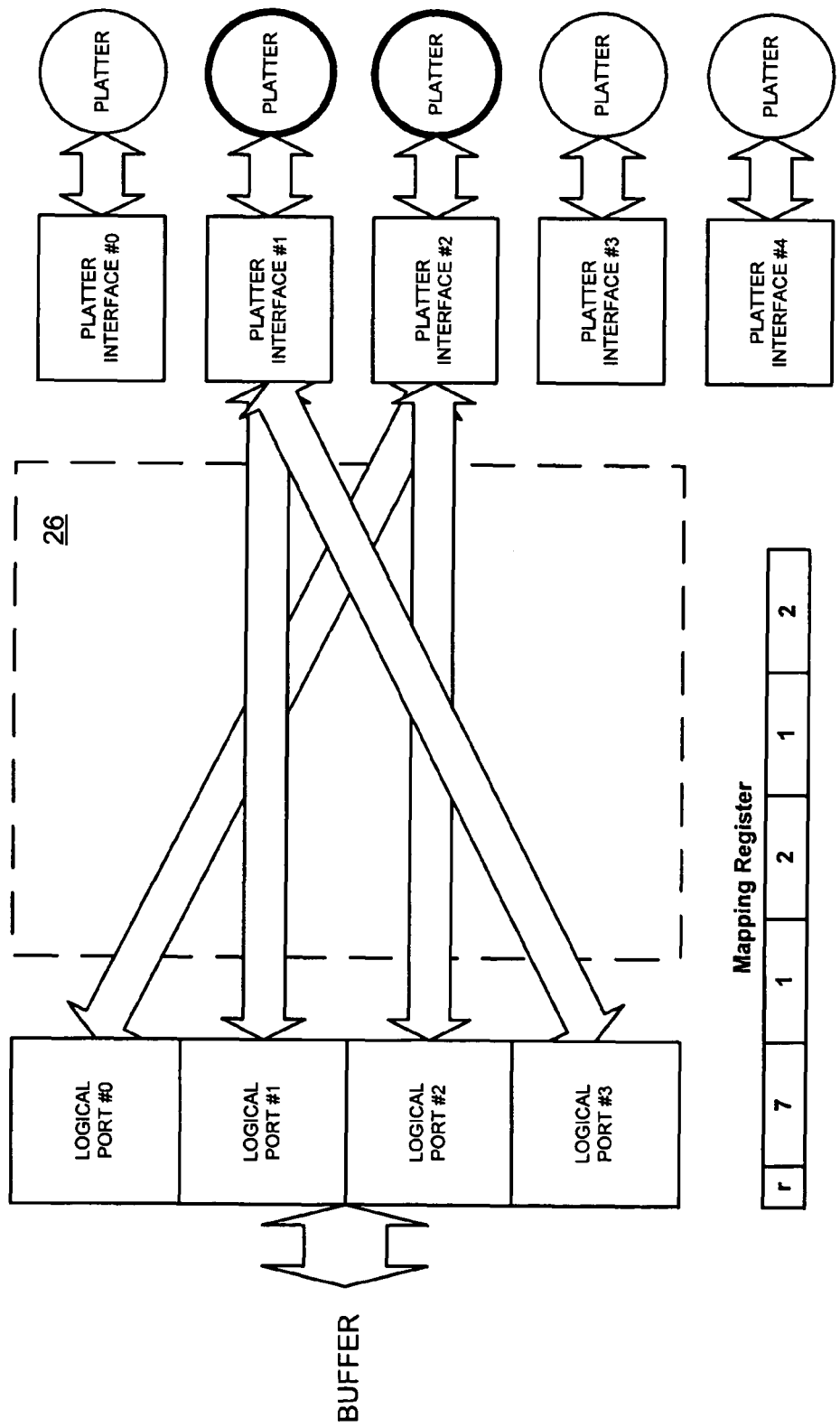
FIG. 5C is a conceptual diagram illustrating a two-platter assignment where each of the two platters is assigned to two of the four logical ports; and it shows an example of corresponding Mapping Register contents.

FIG. 5C shows an example of a two-platter drive where each of the logical ports is assigned to one of the two available platter interfaces, namely Platter interface #1 and Platter interface #2. In order to assemble a 64-bit word for the buffer, each of the 16-bit platters must be read twice. (Or four times in the case of an 8-bit interface.) On the first read, the data for Logical Ports #0 and #1 are obtained from Platter interfaces #2 and #1, respectively. On the second read, Logical Ports #2 and #3 obtain data from Platter interfaces #2 and #1 respectively. These operations are orchestrated by the processor 20. Again, the Mapping Register shows the assignments to Platter interfaces #1 and #2.

Figure 5D:
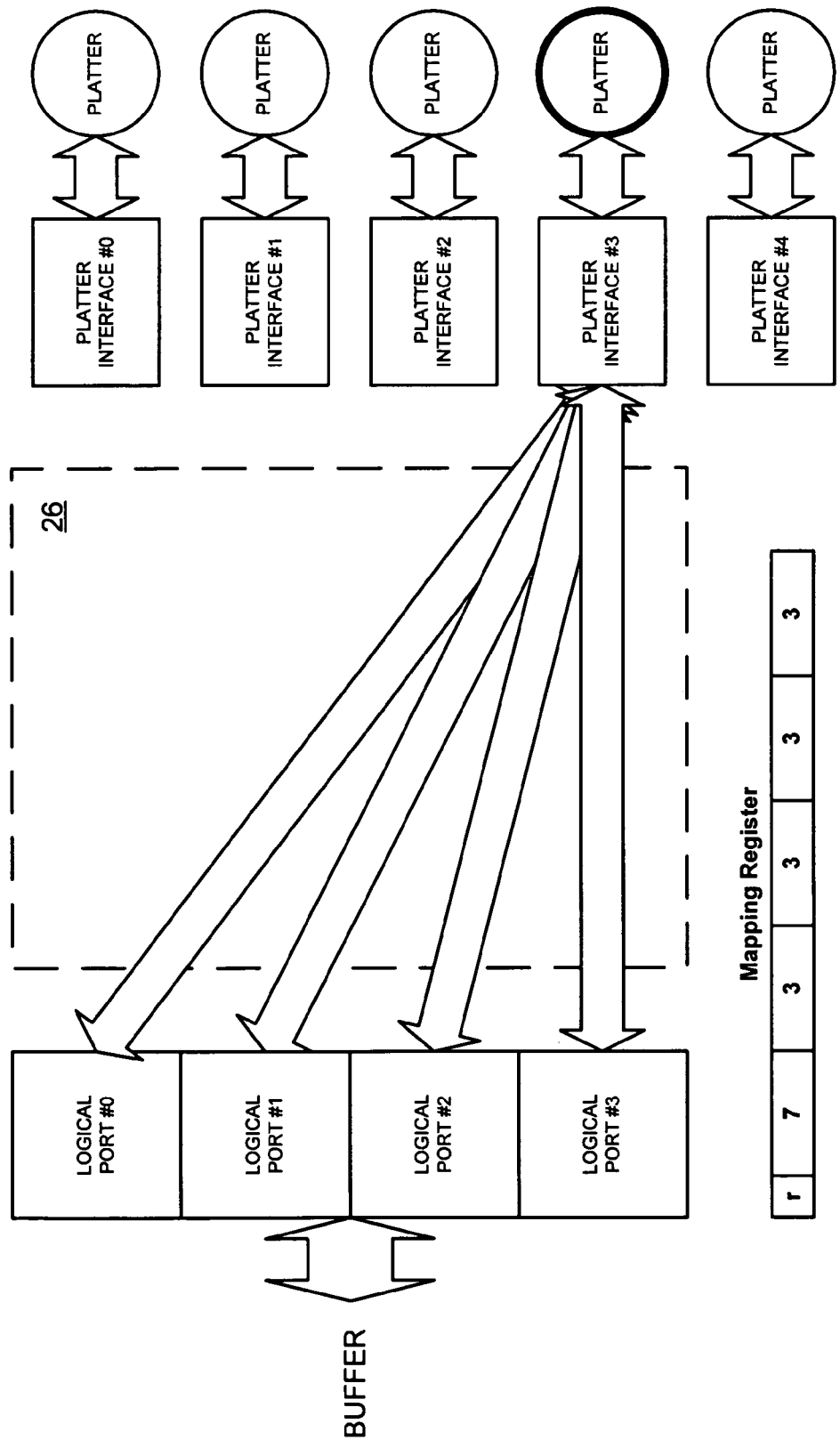
FIG. 5D is a conceptual diagram illustrating a single-platter system where logical ports 0-3 transfer data on successive cycles to platter interface #3; and it shows an example of corresponding Mapping Register contents.

FIG. 5D shows an example of an array with a single platter connected to platter interface #3. For this configuration, the data for logical ports #0 through #3 is obtained by reading the same platter interface four times.

Figure 6A:
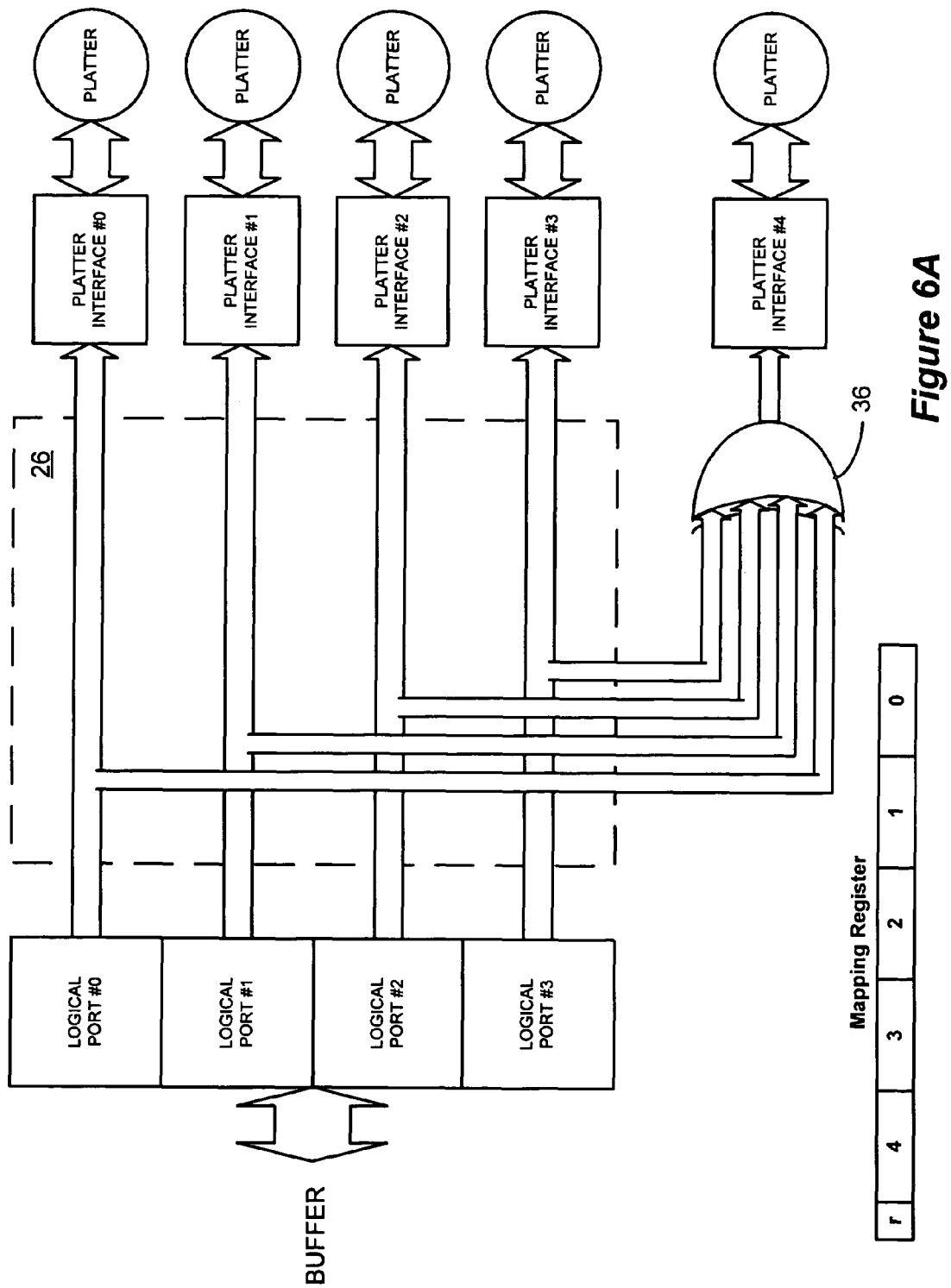
FIG. 6A illustrates XOR logic in the disk write direction in the platter configuration of FIG. 5A; and it shows corresponding Mapping Register contents.

One of the features of the Synchronous Redundant Data Transfers described in U.S. Pat. No. 6,018,778 is that it allows redundant data to be processed "On-The-Fly" as described in U.S. Pat. No. 6,237,052. FIG. 6A shows the four-platter array of FIG. 5A with the addition of logic 36 to compute a redundant data pattern that is stored on the platter attached to platter interface #4. While various arithmetic and logical operations might be used to produce a redundant pattern, the logical XOR between the corresponding bits of the data from the logical data ports has the advantage over an arithmetic operation in that the XOR operation does not have to propagate a carry. Due to the use of the XOR, the fifth platter can be called either the "redundant" platter or the "parity" platter.

Figure 6B:
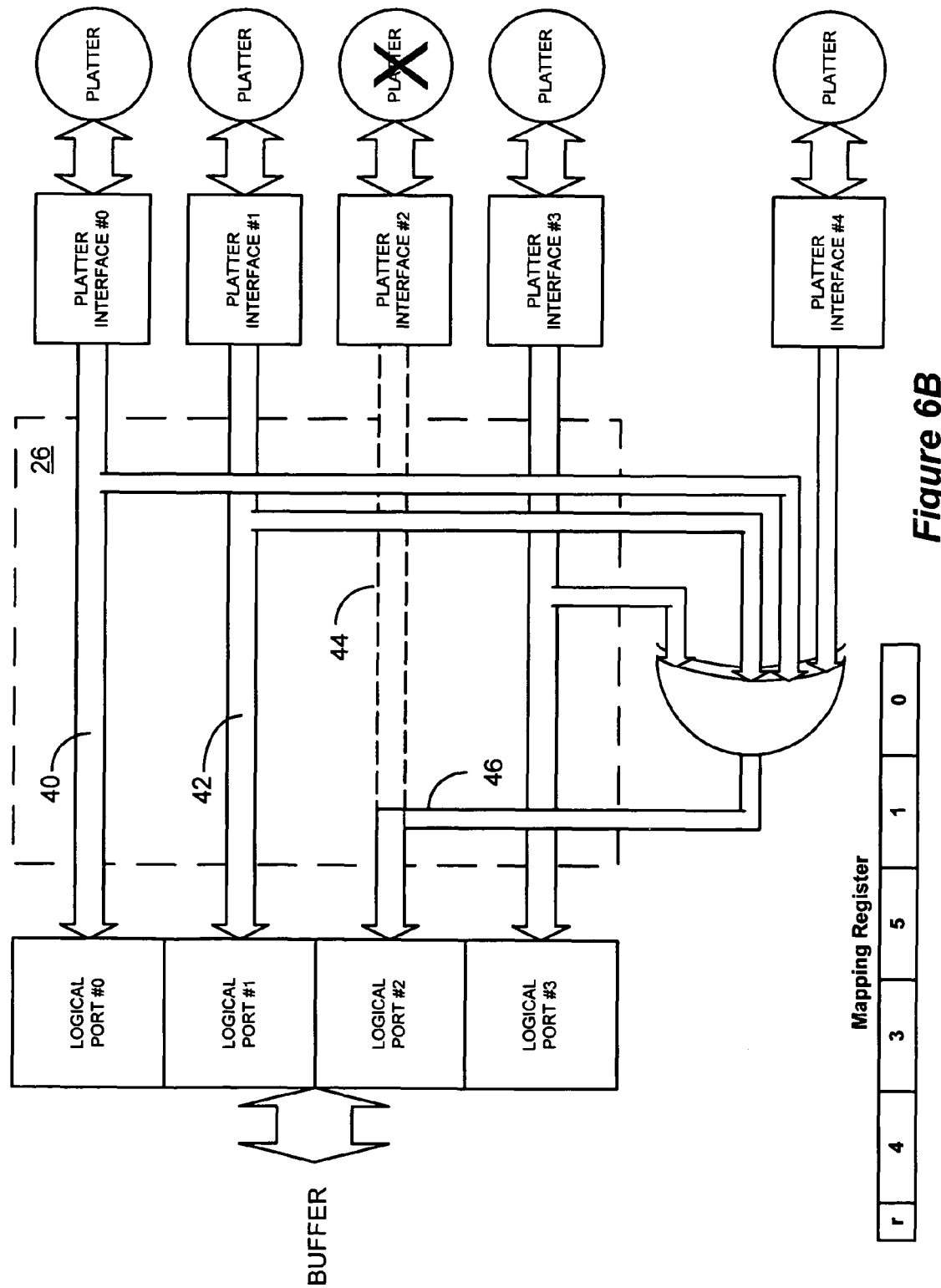
FIG. 6B illustrates the XOR logic in the Disk Read direction for the same data path as FIGS. 5A and 6A except that the platter attached to platter interface #2 has now failed or is defective; and again the Mapping Register contents are shown.

The 16-bit wide Bus XOR shown in the figure is equivalent to sixteen XOR gates, each with four inputs. The use of the XOR function is also very symmetrical between the disk read and disk write operations as can be seen in FIG. 6B. FIG. 6B shows the same four-platter array as defined in FIG. 6B, with the data paths 40, 42 etc. shown for the disk read direction. In this case, the platter attached to platter interface #2 has failed. Accordingly, the corresponding data path 44, which does not function, is shown in dashed lines. The XOR function is computed across the data from the remaining data platters (Platter interfaces #0, #1 and #3) and from the redundant platter, Platter interface #4. This computation reconstructs the data that was stored on the failed platter and the result is directed to logical port #2 via data path 46 in place of the now unavailable data from the failed platter.

The preceding paragraphs demonstrate some examples of the various relationships that might exist between a set of logical ports and a set of platter interfaces. One aspect of the present invention employs a novel mapping register and associated logic to enable software configuration of storage device arrays, and improve performance as further explained below.

In accordance with one embodiment of the invention, a Mapping Register 24, the structure of which is shown in FIG. 7, controls the configuration of the data paths between the logical and platter interfaces. (The Mapping Register also provides other features and advantages discussed later.) In this embodiment, the Mapping Register consists of five fields, one for each of five logical data ports, L0-L4 in this example. Each logical data port's corresponding field in the register is loaded with the number of the platter interface to which it is connected. The data in the field for logical data port 0, is represented symbolically as PP_L0 indicating that it is the Platter interface associated with Logical Port 0. The values in the next four fields are identified as PP_L1, PP_L2, PP_L3, and PP_L4 respectively. The fifth logical data port is a pseudo port. The PP_L4 value is used to assign a Platter interface for the Parity platter.

The Mapping Register fields can be of almost any size. An eight-bit field, for example, would support an array of up to 256 platter interfaces. In the illustrative embodiment, with only five platter interfaces, a three bit field is sufficient. The five fields pack nicely into a sixteen bit register with a bit to spare noted by an "r" in the Figures for "reserved". Any type of non-volatile memory can be used to store the mapping register information.

To demonstrate the use of the Mapping Register, we will briefly revisit each of the configurations described so far. In FIG. 5A, note that a Mapping Register 24 is shown. The value of PP_L0 is 0 indicating the logical data port #0 is connected to platter interface #0. The next three values are 1, 2, and 3 indicating that the next three logical data ports are connected to the next three physical data ports. The value of PP_L4 is 7. This is not a legal platter interface number in this example. The value "7" is used to indicate that there is no parity platter in this configuration. The specific value chosen is not critical, as long as it is not an actual platter interface number.

Referring again to FIG. 5B, the values stored in the Mapping Register indicate that platter interfaces 1, 2, 4, and 0 support the logical ports 0 through 3 respectively. Once again, the "7" indicates that a parity platter is not used. FIG. 5C shows the Mapping Register configured for a two-platter array. Note that logical data ports #2 and #3 are associated with the same platter interfaces as logical ports #0 and #1. The first two logical ports transfer data on the first platter interface cycle while the second two logical ports transfer data on the second platter interface cycle.

FIG. 5D shows the Mapping Register configured for the single platter case. Logical ports #0 through #3 transfer data on successive cycles to platter interface #3. All of the variations of FIG. 5 are different data path configurations shown independent of the redundant data logic.

FIG. 6A shows the XOR logic in the Disk Write direction for the same data platter configuration as FIG. 2A. The XOR is computed over the data from all four of the logical data ports. The result is stored on the platter attached to the platter interface specified in logical port #4 field of the Mapping Register. In this example, PP_L4 has a value of "4" instead of "7" indicating that there is a parity platter and that it is attached to port #4.

FIG. 6B shows the XOR logic in the Disk Read direction for the same data path as FIGS. 5A and 6A, except that the platter attached to platter interface #2 has now failed. The contents of the Logical Data Port 2 field, PP_L2, has been replaced with a "5". The legal platter interface numbers are 0 through 4. The "5" is a reserved value used to indicate that a drive has failed. Any logical data port accessing the pseudo platter interface number 5 will take its data from the output of the XOR.

Data Path Switch

In the preceding discussion, we have demonstrated that four values loaded into the fields of a Mapping Register may be used to represent all of the possible configurations between four logical data ports, and 1, 2, or 4 platter arrays attached to five platter interfaces, with or without a redundant platter; and for the drives with redundant platters, with or without a failed platter. The following will describe how the contents of the Mapping Register is used to configure the hardware blocks and the data paths. The following discussion, in other words, presents the details of a presently preferred implementation of the data path switch 26, and how it is configured by the mapping register contents.

Figure 8A:
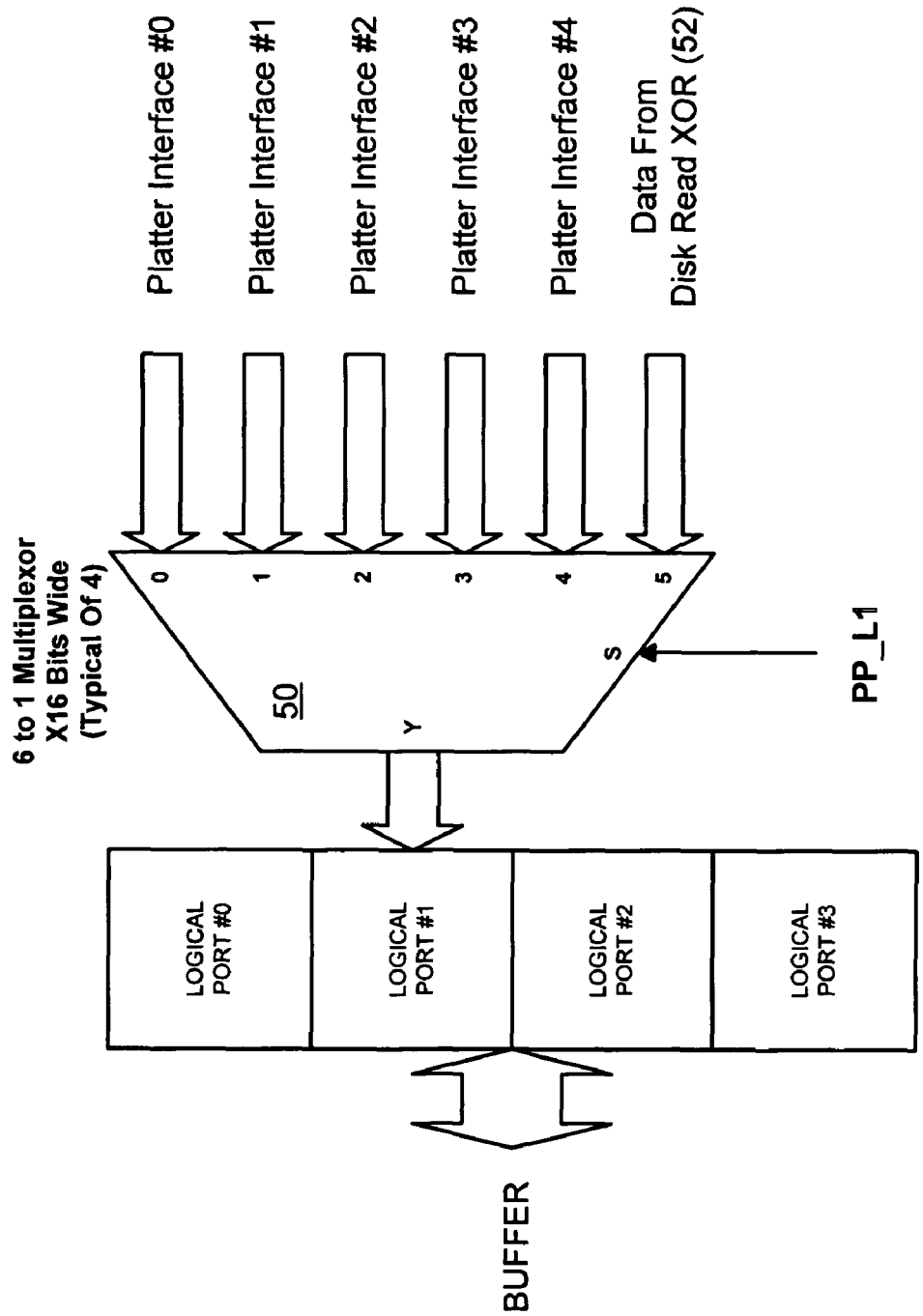
FIG. 8A is a conceptual diagram of multiplexer circuitry in the logical port #1 read data path.
Figure 8B:
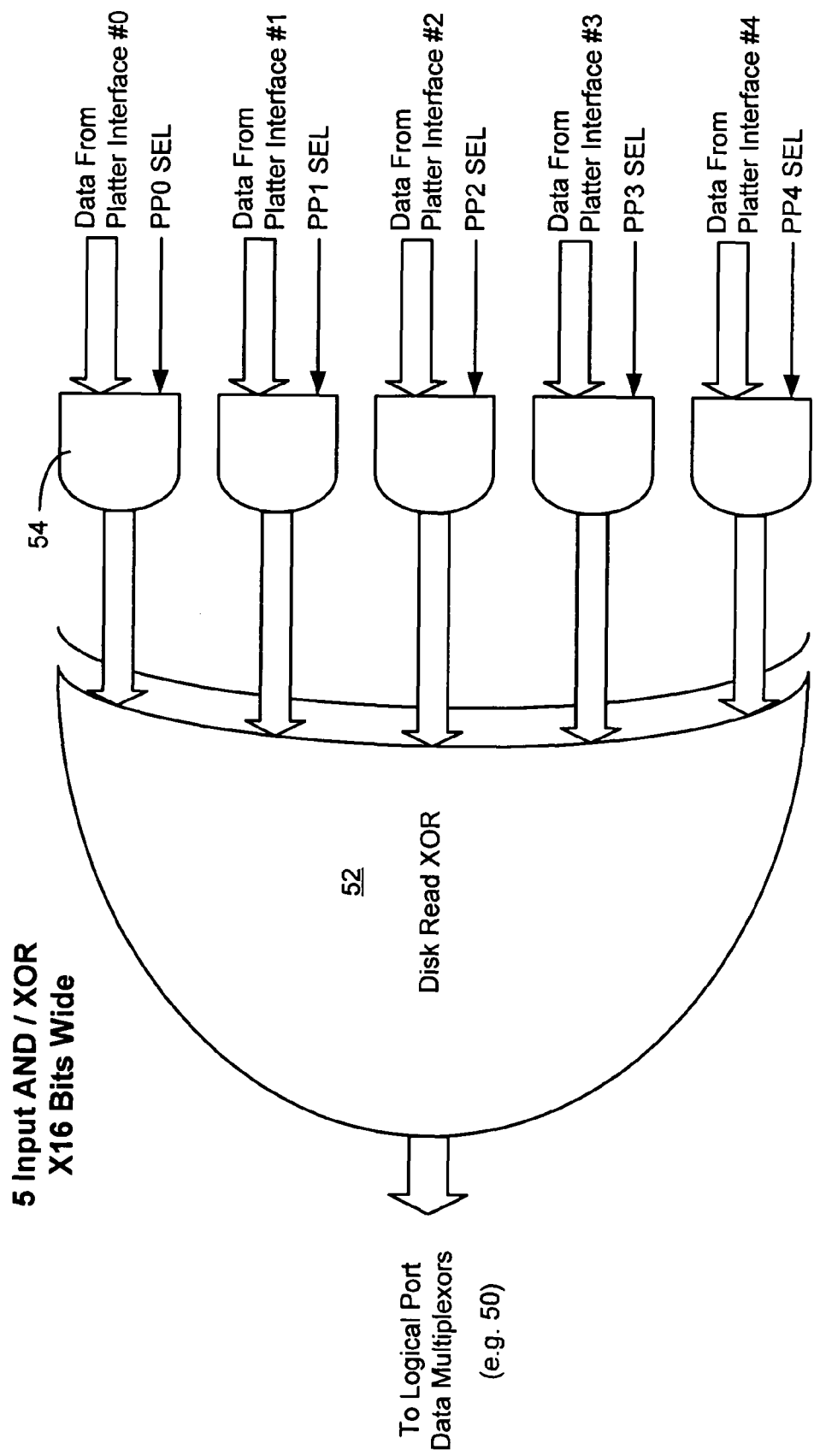
FIG. 8B illustrates disk read XOR logic in one embodiment of the multi-platter disk controller.

Referring now to FIG. 8A, each of the four logical data ports must be able to receive data from any of the five platter interfaces or, in the case of a failed platter, from the Disk Read XOR (52 in FIG. 8B). With the six possible data sources, each of the platter interfaces has a corresponding six-to-one multiplexor 50, sixteen bits wide. The multiplexor 50 for logical port 1 is shown in the FIG. 8A, but the others (for Logical Ports #0, #2 and #3) are identical. The selector or "S" input of the multiplexor is connected to Logical Port #1 field of the Mapping Register—"PP_L1". The PP_L1 values of 0 through 4 select data from platter interfaces #0 through #4 respectively while a the value "5" selects the output of the Disk Read XOR.

FIG. 8B shows the Disk Read XOR logic 52. The Disk Read XOR 52 is a five-input XOR circuit, sixteen bits wide in the preferred embodiment (corresponding to the attached disk platter data paths). (This is equivalent to sixteen XORs, each with five inputs.) Each of the five inputs is logically qualified or "gated" by a corresponding AND gate, also sixteen bits wide, for example AND gate 54. (This is equivalent to sixteen NAND gates, each with two inputs.) The five NAND gates are qualified by the corresponding five platter interface select signals, PP0_SEL through PP4_SEL. The generation of these signals will be described below.

Figure 9:
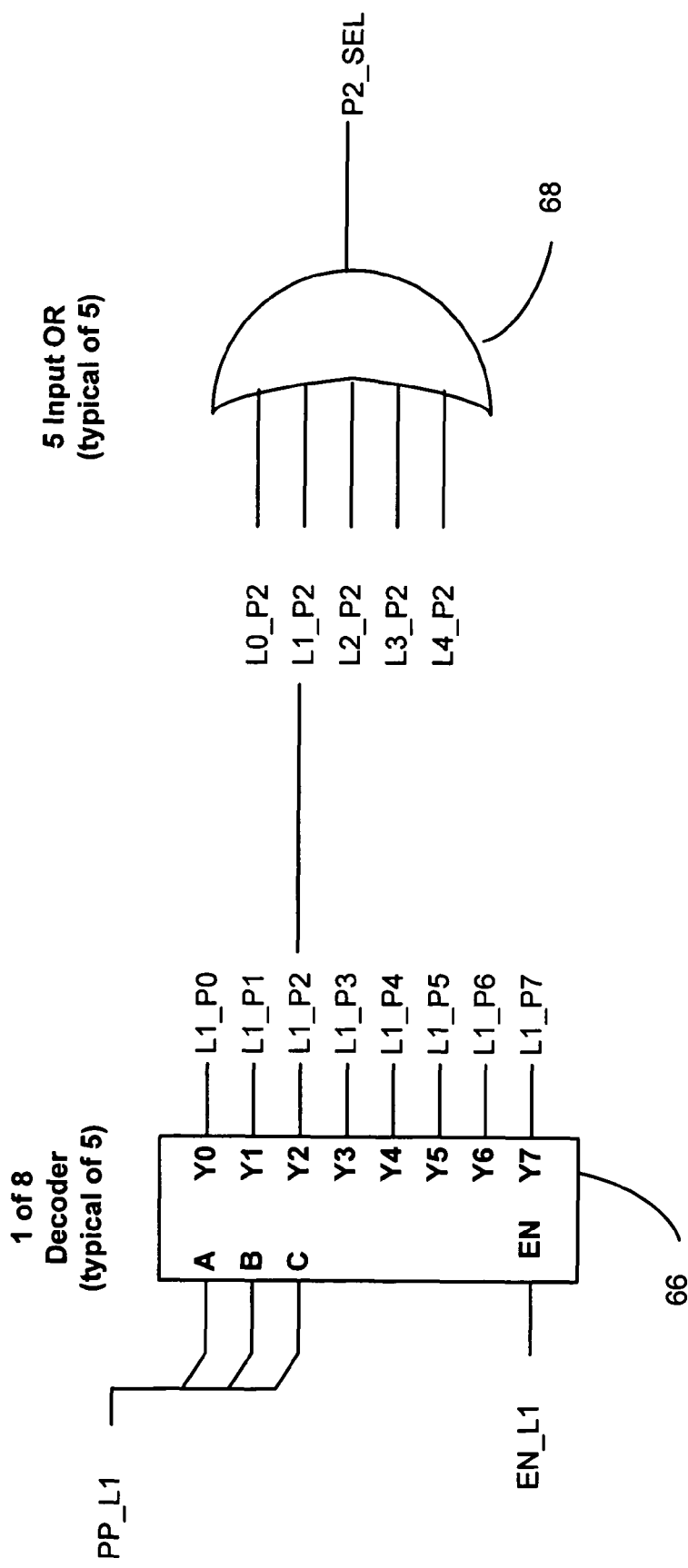
FIG. 9 illustrates decoder logic for the Logical Port #1 (PP_L1) field of the Mapping Register in one embodiment of the multi-platter disk controller.

The data path to each of the platter interfaces may come from any of the four logical data ports, or from the Disk Write XOR. Examples were shown with reference to FIGS. 5A-5D. While a field of the Mapping Register identifies the data source for each of the logical data ports, we do not have a field that provides the corresponding data for each of the platter interfaces. This information can be derived from the fields that we do have. Each of the three bit binary encoded fields of the Mapping register is decoded with a "one of eight" decoder. FIG. 9 shows such a decoder 66 for the Logical Port #1 field. The value PP_L1 is decoded into L1_P0, L1_P1, L1_P2 . . . L1_P7 where the names indicate a path from a source to a destination. L1_P2, for example, indicates a path from Logical Port #1 to Platter interface #2.

Figure 10A:
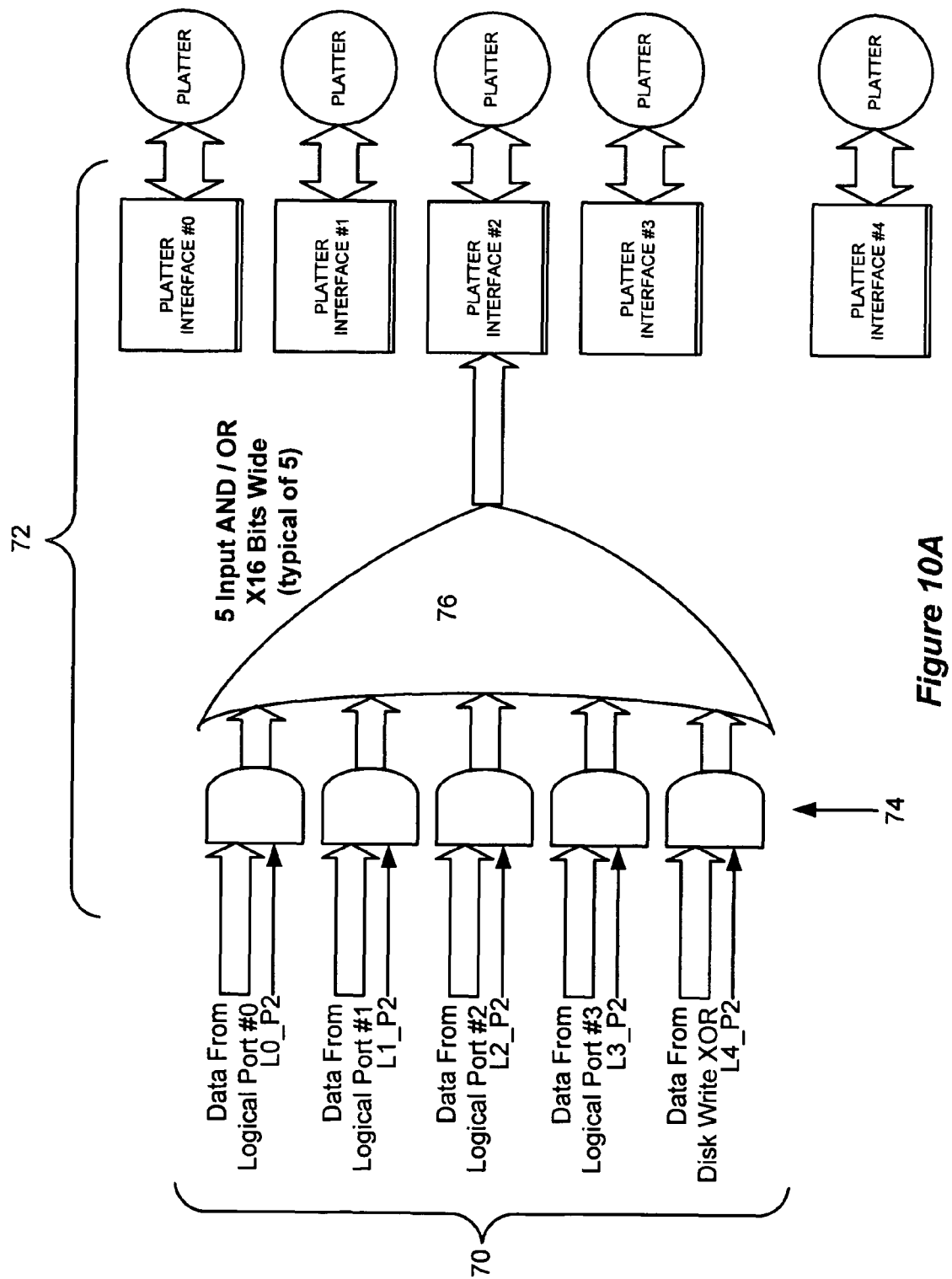
FIG. 10A illustrates logical port to platter interface data path logic in one embodiment of the drive controller (illustrated for platter interface #2 only).
Figure 10B:
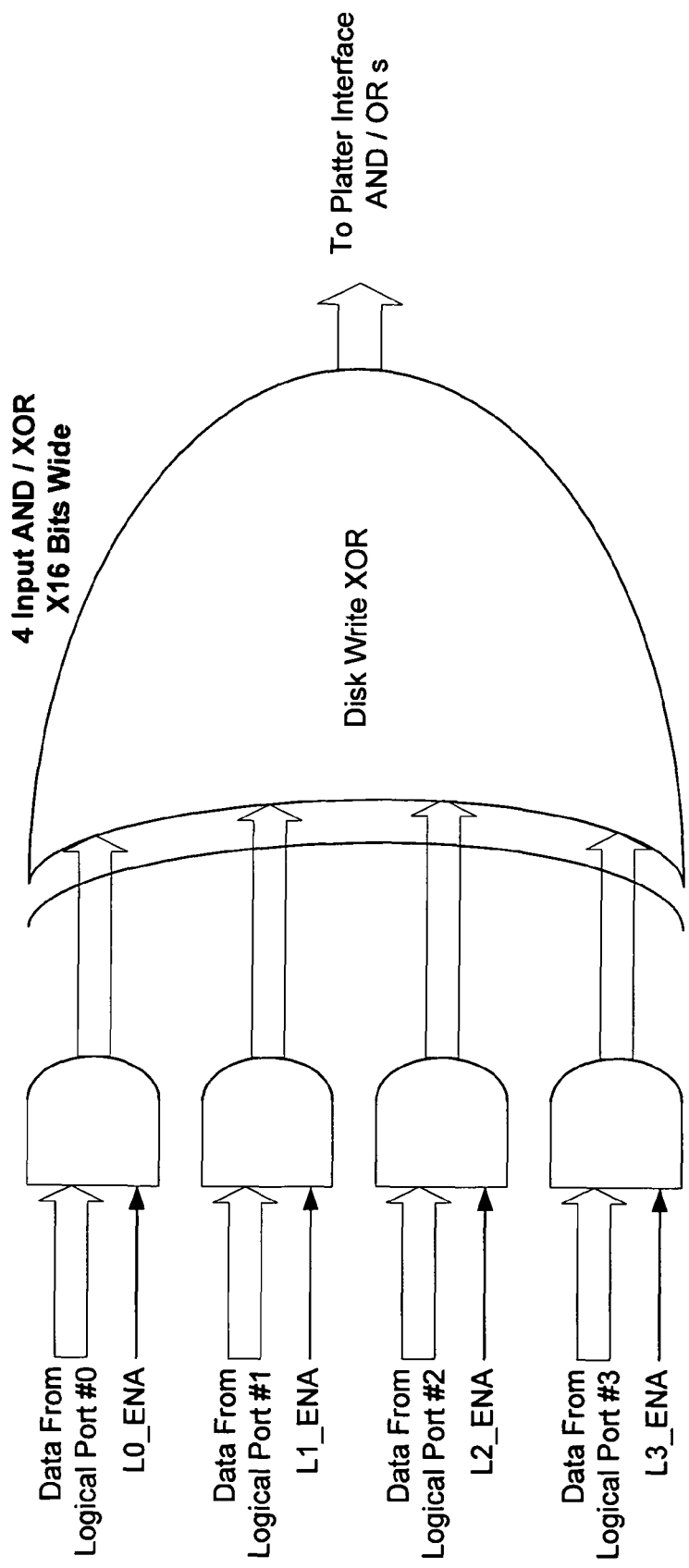
FIG. 10B illustrates disk write XOR logic in one embodiment of the multi-platter disk controller.

Referring now to FIG. 10A, sample circuitry is shown for multiplexing of the data paths 70 from the logical data ports to the platter interfaces (#0-#4). The multiplexor 72 for platter interface #2 is shown in the figure, but the multiplexors for the other four platter interfaces (not shown) are identical. Each of the multiplexors 72 consists of an AND/OR array with five AND gates 74, all sixteen bits wide, and a corresponding OR gate 76. (Each of the AND gates is equivalent of sixteen AND gates, each with two inputs. The OR gates is equivalent to sixteen OR gates, each with five inputs.) For the platter interface #2 multiplexor, the AND gates from the logical data ports are qualified by the corresponding outputs of the five decoders, i.e. L0_P2, L1_P2, L2_P2, L3_P2, and L4_P2 as shown.

At this point, there are two open issues to resolve. In a two-platter configuration, a given platter interface received data from two different logical ports, though on different cycles. Referring back to FIG. 9, each of the decoders 66 has an enable input "EN" that qualifies all of its outputs. For the two-platter configuration, only the decoders for logical data ports #0 and #1 are enabled on a first cycle, and only the decoders for logical data ports #2 and #3 are enabled on a second cycle. For this reason, only one of the AND gates in FIG. 10A will be qualified at a time. In other words, only the data from the assigned logical port (according to the mapping register) is input to the corresponding platter interface.

In a single-platter array where a single platter interface receives data from all four logical ports (See FIG. 5D), only one decoder 66 is enabled at a time so that only one AND gate 74 will be enabled at a time selecting a unique data source (Logical Port). The other open issue was the source for the "PPn_SEL" signals of FIG. 8B. FIG. 6 show the use of a five-input OR gate 68 that will assert the PPn_SEL signal for a platter interface "n" if there is a data path between the subject platter interface and any of the logical ports. This provides an indication that the platter interface is active and may participate in the Disk Read XOR in FIG. 8B.

Global Read & Writes

In accordance with the ATA/ATAPI specifications, sending commands to the drives requires the use of Programmed IO or PIO mode that may be as slow as 600 nS per access for devices that support only PIO Mode 0 and no better than 120 nS per access for devices supporting Mode 4. A single command requires eight or more accesses. If all of the drives have to be commanded sequentially, this time is multiplied by the number of drives and adds considerable latency to the entire process. The commands could be issued concurrently by an independent controller per port, but this adds considerably to the complexity and cost.

When data is striped over an array of drives, portions of a given stripe will be located at the same relative position on each of the drives. This makes the address of the data, the Logical Buffer Address or LBA, the same for each of the drives. As a result, the commands to read a given stripe are identical for all of the drives of the array. And the commands to write a given stripe would be identical as well. This makes it possible for the local processor (e.g. 20 in FIG. 4) to "broadcast" common commands in no more time than would otherwise be required to send a command to a single drive.

As noted earlier, a drive array may consist of a subset of the attached drives. (One of the advantages of the present invention is the ability to easily configure, or reconfigure, the organization of attached drives into defined arrays simply by storing appropriate configuration bytes into the mapping register.) In the case where an array consists of a subset of the attached drives, commands (such as read and write) may only be "broadcast" to the selected subset. Either the drives must be commanded one at a time, or some means must be provided to "mask" the physical data ports not participating in the current array. FIG. 8 shows one implementation to address this issue.

Figure 11:
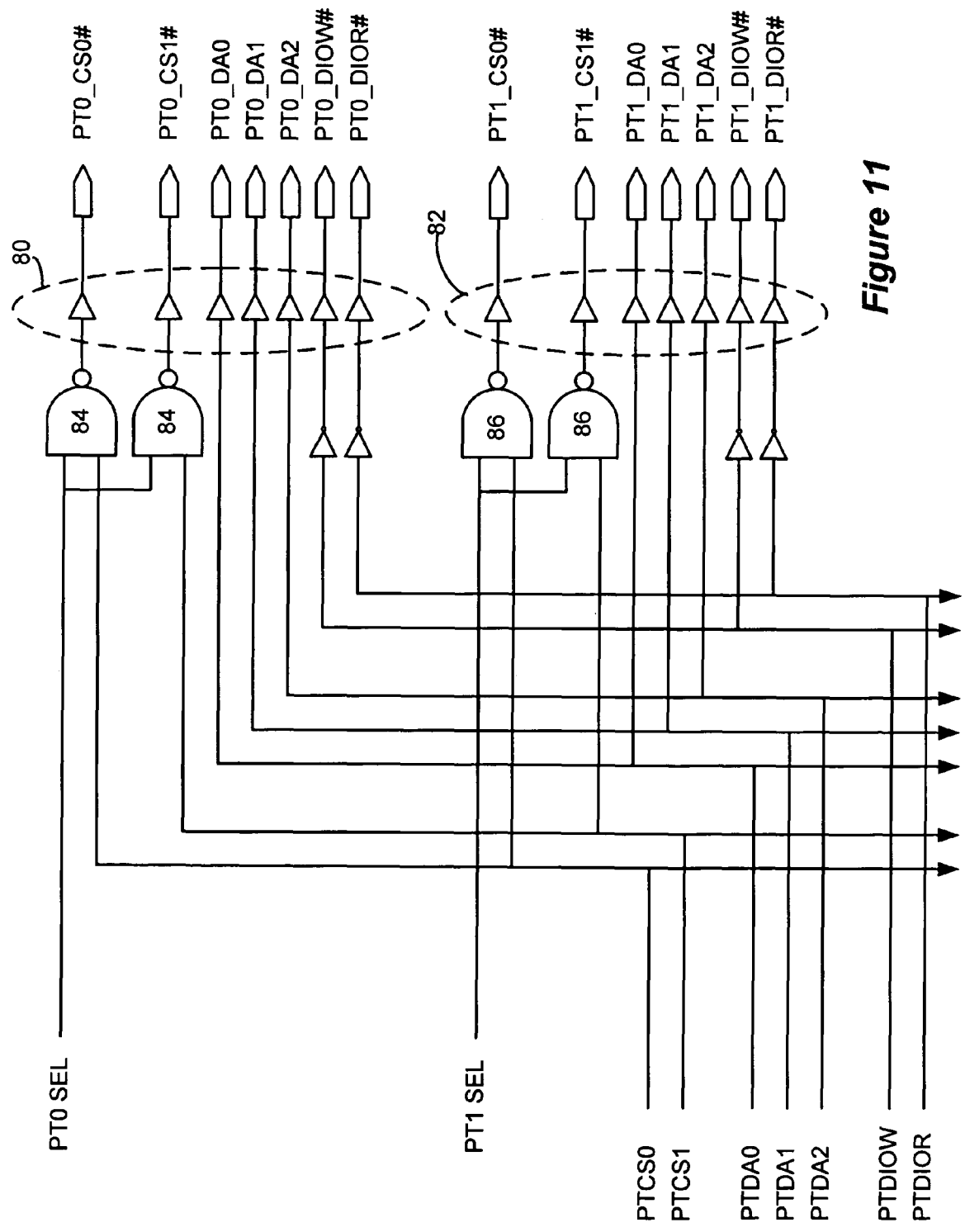
FIG. 11 illustrates disk address, strobe and chip select logic to enable global access commands to all platters of an attached drive.

Referring to FIG. 11, the address, strobe, and chip select signals CS0, CS1, DA0, DA1, DA2, DIOW and DIOR are shown for the first two of the five platter interfaces (P0 and P1). Note that these address and strobe signals are common to all five ports. They are buffered individually so that a failure of a given drive cannot block the propagation of these signals to the other drives. See buffers 80,82. The output drivers for the two chip select signals CS0#, CS1# of a given port are qualified by the Pn_SEL signal for that port; see gates 84, 86. Any port not selected by the current contents of the Mapping Register will not have either of its chip selects asserted and therefore will ignore the read and write strobes.

It may seem that a "global read" does not make any sense as it implies that potentially conflicting data values are returned on a common bus. In the current embodiment, a "global read" causes a read strobe, FIG. 11 Pn_DIOR#, to be "broadcast" to all of the physical data ports. Those attached storage devices qualified by a chip select (Pn_CS0#, Pn_CS1#) will return data to the platter interface where it is latched at the trailing edge of the Pn_DIOR# strobe. No attempt is made to return a data value to the local processor as a result of this read cycle.

The local processor will then read each of the ports one at a time using a different address which does not cause a repeat of the Pn_DIOR# strobe cycle and without changing any of the latched data. These cycles do allow the local processor to fetch the potentially unique values stored in each of the data latches. The Pn_DIOR# cycle which may require up to 600 nS is only executed once. The values latched in each of the ports may be fetched in 15 ns each for a significant time savings over repeating the Pn_DIOR# cycle five times.

The "global read" and "global write" apparatus allows the local processor to send commands to and receive control status from the currently selected array in the minimum possible amount of time. When a different sub-array is selected by loading a new value in the Mapping Register, the control interface updates automatically without other code changes.

Status Ordering

Figure 12:
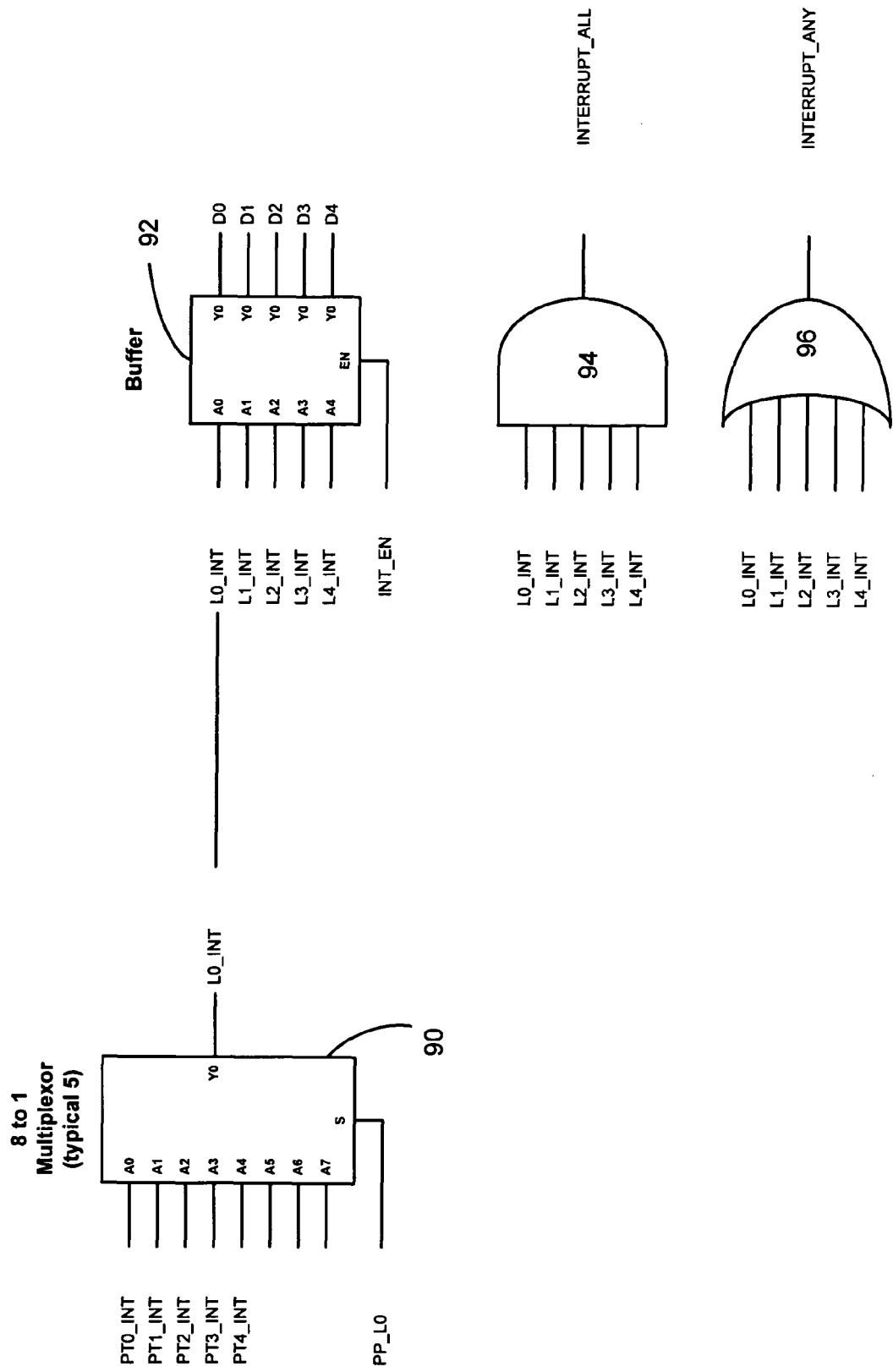
FIG. 12 illustrates interrupt signal logic in one implementation.

The preceding discussion dealt with generating many of the platter interface outputs and showed how they were steered by the Mapping Register. Each of these ports has a number of input signals as well. Once again, associating these signals with logical drives can minimize the software overhead. For example, each of the drives has an interrupt output used to signal the need for service from the controller. FIG. 12 shows the use of a multiplexor 90 controlled by PP_L0 value from the Mapping Register to select the interrupt of the platter interface associated with logical data port zero. Each of the other logical data ports has an identical multiplexor (not shown) that uses the corresponding PP_Ln value to locate its interrupt. In FIG. 12, the buffer 92 takes the selected interrupts from each of the logical data port multiplexors (90 etc.). When the local processor (20 in FIG. 4) reads the interrupt status through this buffer, the interrupts appear in logical data port order starting with logical data port zero in the bit zero position. The same technique can be used to sort both internal and external signals from the physical data ports including drive cable ID signals and internal FIFO status signals. This feature enables the local firmware to use a common sequence of code for multiple arrays with different numbers of platter interfaces. Once the interrupt buffer 92 is loaded, the required status bits are always the least significant bits of the "sorted" register for any array selected. The number of bits may be masked down to the actual number of ports.

Interrupts ANY and ALL

The selected interrupts from the logical data ports can be logically ANDed 94 and ORed 96 as shown in FIG. 12 to provide signals "Interrupt ALL" and Interrupt ANY". When the local processor has issued a command, and before any data has been transferred, it might want to know about an interrupt from ANY of the drives as one or more drives may have rejected the command or had some other error. Once the drives have begun to transfer data, the local processor will want to know when ALL of the drives have asserted their interrupt signals as this indicates the completion of the command. Note that this type of implementation makes the software independent of the number of drives. (For a two-drive array, the interrupt signal from each device appears twice while in a single drive array, the same drive appears four times. The AND and ALL signals still function correctly.)

Logical Address Mapping

While the bulk of the run-time software takes advantage of global commands and status described above there is still the requirement to access individual devices for initialization and for handling errors within specific devices. For this purpose, each of the physical data ports appears at unique location within the local processor address space. When an access to any of these locations is decoded, the decoded output if remapped according to the contents of the Mapping Register.

During initialization, the Mapping Register is loaded with an "identity" pattern, i.e. logical device 0 points to platter interface 0, logical device 1 points to platter interface 1, etc. This makes the platter interfaces appear in order starting with first platter interface location in the processor's address space. In normal operation the Mapping Register will be loaded with a logical to physical drive map. If an interrupt is then received from logical port 2, the local processor may access the interrupting drive through the unique address space that accessed platter interface 2 when the identity map is loaded. This makes the servicing of logical drives independent of the physical data port to which they are attached.

Figure 13:
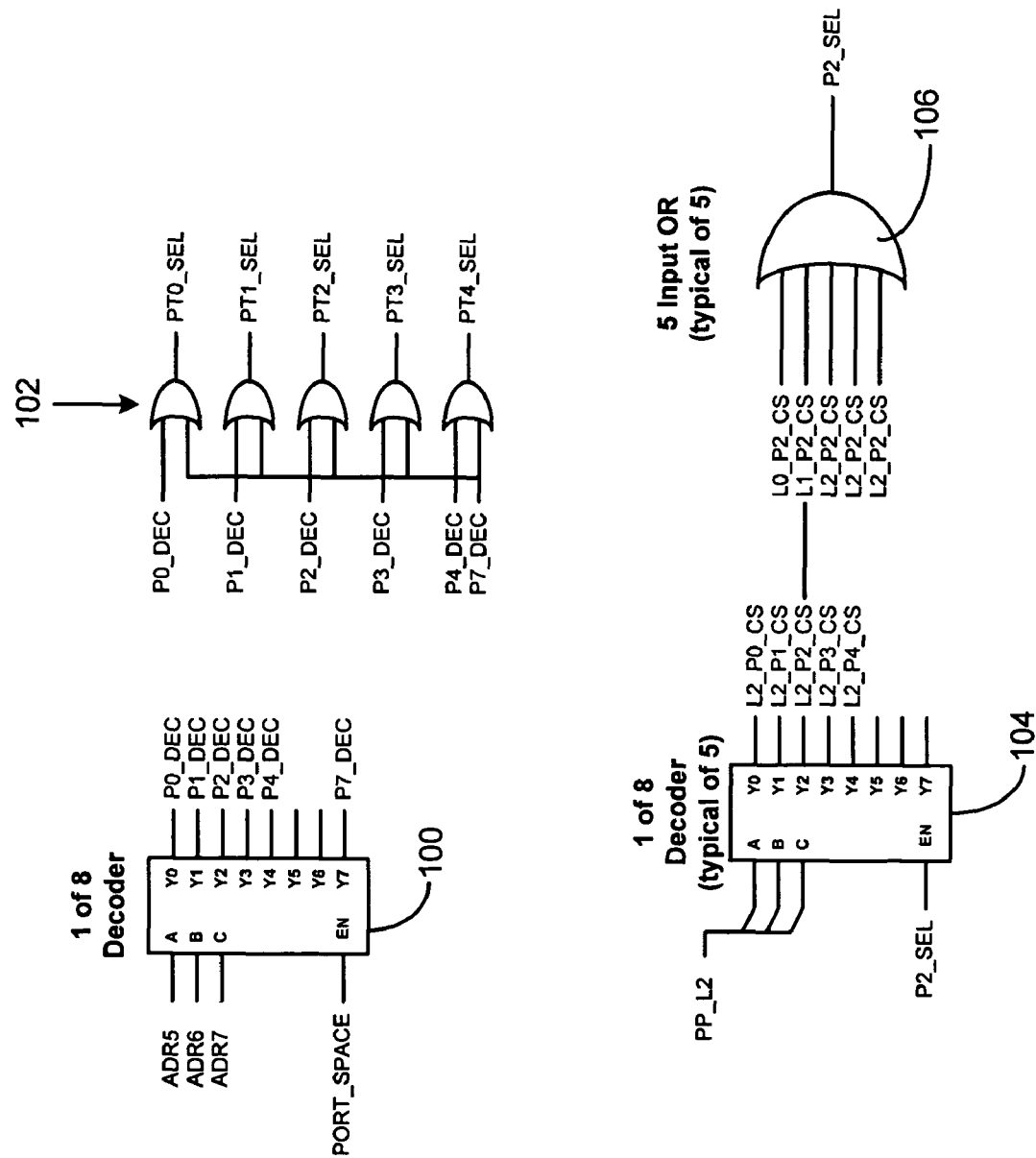
FIG. 13 illustrates a hardware implementation of logical addressing.

One hardware implementation of the logical addressing feature is shown in FIG. 13. When the processor accesses the address region for the device port space, the one of eight decoder 100 decodes processor address lines five through seven defining thirty-two byte spaces for each of the devices. The decoding of each space asserts the corresponding port N decode signal, Pn_DEC. The decoding of the virtual port number seven is the signal for a global access. The P7_DEC signal or ORed with each of the other decode signals 102 so that the resulting port select signals Pn_SEL (n=0-4) are asserted both for a specific access of that port and for a global access.

Each of the port select signals is then steered by the PP_Ln values from the Mapping Register. The one-of-eight decoder 104 takes the P2_SEL signals and routes it according to the PP_L2 value from the Mapping Register producing a set of signals of the form L2_P0_CS indicating a chip select from platter interface zero from logical port two. The one-of-eight decoders for the other four logical ports are identical (not shown).

Each platter interface has a five-input OR gate, for example 106. The OR gate 106 for platter interface #2 is shown. It ORs together the five different sources for a chip select to platter interface #2. Note that for a single-drive sub-array, the chip select will be asserted by all four logical devices and for a dual drive sub-array, the chip select is asserted by two of the logical devices.

In the foregoing description and in the drawings we illustrated several examples of one type of mapping register; it can be called a logical mapping register. As explained, it provides a field for each logical drive in a defined array, and in that field, a value indicates a corresponding platter interface number. In an alternative embodiment, called a physical mapping, a register provides a field for each platter interface or attached drive, and in each field, a value indicates a corresponding logical port number. This alternative mapping register is illustrated in the following example.

Assume an array is to be defined for striped data over four drives. Blocks of the stripe width are stored on each of the available drives in a specific sequence. This process is then repeated. For example, the first block of data (as well as the 5th, 9th, etc) is stored on the drive connected to platter interface #1. The second block (as well as 6th, 10th, etc) is stored on the drive connected to platter interface #2. The third block of data (as well as 7th, 11th, etc) is stored on the drive connected to platter interface #4. The first block of data goes on logical drive 0, the second on logical drive 1, the third on logical drive two and the fourth on logical drive 3. The two alternative types of mapping registers for this case are as follows:

Logical Mapping:

| | Logical Port # | | | |
|---|---|---|---|---|
| | 3 | 2 | 1 | 0 |
| Value (Platter interface) | 0 | 4 | 2 | 1 |

Physical Mapping:

| | Platter interface # | | | | |
|---|---|---|---|---|---|
| | 4 | 3 | 2 | 1 | 0 |
| Value (Logical Port #) | 2 | — | 1 | 0 | 3 |

It will be obvious to those having skill in the art that many changes may be made to the details of the above-described embodiments of this invention without departing from the underlying principles thereof. The scope of the present invention should, therefore, be determined only by the following claims.

We claim:

1. A disk drive for digital data storage comprising:
   a plurality of rotatable platters, each platter comprising a magnetic data storage surface;
   a common spindle arranged for rotating all of the platters in unison;
   a corresponding magnetic read/write head for each of the platters;
   a corresponding platter interface circuit coupled to each of the read/write heads for reading and writing data from and to the corresponding platter while the platters are rotating, each platter interface providing a respective data path to the corresponding read/write head;
   an independent actuator coupled to each of the read/write heads for positioning the corresponding read/write head relative to the corresponding platter surface;
   circuitry for writing user data to at least one of the platters of the drive via the corresponding platter interface;
   circuitry for writing redundant data associated with the user data to at least one other platter of the drive via its corresponding platter interface; and
   a mapping register for controlling selection of data paths between a host interface and the platter interfaces;
   wherein the magnetic data storage surface is utilized for generating the redundant data.

2. A disk drive according to claim 1 including a data path switch for controllably selecting the data paths between the host interface and the platter interfaces.

3. A disk drive according to claim 1 including XOR logic for generating the redundant data.

4. A disk drive according to claim 1 including XOR logic for regenerating the user data in the event of a platter failure or unavailability.

5. A disk drive according to claim 1 including buffers for synchronizing data flow to and from the platter interfaces so as to enable on-the-fly redundancy calculations.

6. A disk drive according to claim 5 wherein the buffers comprise FIFO buffers.

7. A disk drive according to claim 1 including a standard SATA host interface so that the internal redundancy operations are transparent to a host.

8. The disk drive of claim 1 including a host IDE so that internal redundancy operations are transparent to a host.

9. The disk drive of claim 1 including a SCSI link so that internal redundancy operations are transparent to a host.

10. The disk drive of claim 1 further comprising generating the redundant data associated with a platter with a bad sector at one of a read point and a write point.

11. A disk drive according to claim 1 including XOR logic for regenerating the user data from at least one of the platters with a bad sector at one of a read point and a write point during data transfer.

12. A disk drive according to claim 1 wherein individual data paths to and from the corresponding magnetic read/write head for each of the platters are combined and fed directly to an XOR-switch-SRDT arrangement.

13. A disk drive according to claim 1 wherein one of the plurality of rotatable platters acts as a parity platter.

14. A method of improving reliability in a single disk drive comprising the steps of:
   utilizing multiple platters within the single disk drive as independent parallel data stores; and
   controllably selecting data paths between a host interface and interfaces associated with the multiple platters utilizing a mapping register;
   wherein the utilizing step includes storing user data on at least one platter of the drive and storing associated redundant data on at least one other platter of the drive;
   wherein a magnetic data storage surface is utilized for generating the redundant data.

15. The method of claim 14 further comprising controllably selecting the data paths between the host interface and the interfaces associated with the multiple platters utilizing a data path switch.

16. The method of claim 14 wherein the redundant data is generated utilizing XOR logic.

17. The method of claim 14 wherein the user data is regenerated in the event of a platter failure or unavailability utilizing XOR logic.

18. The method of claim 14 further comprising synchronizing data flow to and from the interfaces associated with the multiple platters utilizing buffers so as to enable on-the-fly redundancy calculations.

19. The method of claim 18 wherein the buffers comprise FIFO buffers.

* * * * *